3,337,177
OUTSIDE REAR-VISION MIRROR FOR MOTOR-VEHICLES
Yorck Joachim Talbot, 80 Ebersstrasse, Berlin 62, Germany
Filed Mar. 31, 1964, Ser. No. 356,253
6 Claims. (Cl. 248—483)

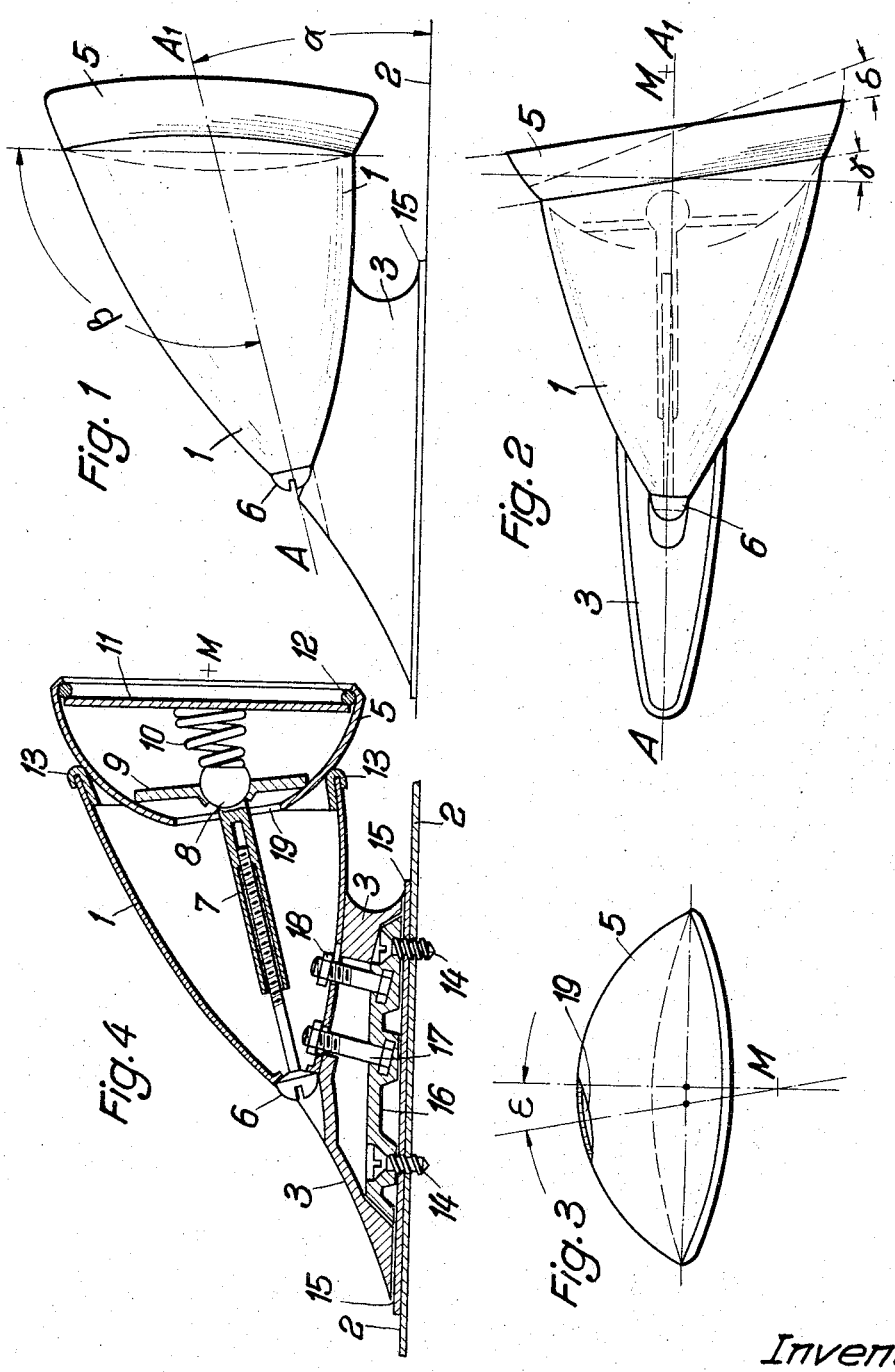

The object of the present invention is to provide an improved outside rear-vision mirror, particularly for motor-vehicles, which may be secured to the front mudguards or the door of such a vehicle.

The outside rear-vision mirror in accordance with the invention is not only of a shape which is aerodynamically advantageous and which presents no danger to other drivers in case of an accident, but also provides for a very wide angle of adjustment and can be affixed to parts of the coachwork even if they are not accessible from inside or from below. The mounting arrangement is concealed and theft of the novel mirror is thus largely prevented.

The main feature of the invention resides in the fact that the housing of the rear-vision mirror is connected with the separate base in such a manner as to form therewith a continuous line which rises smoothly in the direction toward the rear, that is opposite the direction of vehicle movement. The open rear end of the housing has an endface comprising two portions forming with one another two oblique angles. The hole provided in the mirror-holder for limiting the adjustability-range thereof relative to the housing is positioned eccentrically. Finally, the base includes a separate mounting part located between the main base part and the coachwork different angles, and that the hole provided in the mirror-holder and limiting the adjustability-range is positioned eccentrically, and finally, a further base and affixed from the outside to the coachwork by means of self-cutting sheet-metal screws. The mounting part includes two further screws projecting obliquely therefrom and by means of which the main base part and the housing, into which the screws extend, are conneced to the mounting part.

A further feature of the invention resides in the fact that a set-screw which passes through the housing and connects the mirror-holder thereto, is connected by a ball-and socket joint to a centering-disc which is movably arranged within the spherical mirror-holder, and that the said disc can automatically adjust itself to the position required for the angle of adjustment prevailing at a given moment, the ball of the joint always being forced into a ball socket on the centering-disc by the pressure-spring which also serves to support the glass of the mirror.

An embodiment of a rear-vision mirror in accordance with the invention is shown in the accompanying drawing, wherein:

FIGURE 1 is an elevational side-view of the outside rear-vision mirror assumed to be mounted on a vehicle left-hand side of the body;

FIG. 2 is a top-plan view of the same mirror;

FIG. 3 shows the empty mirror-holder, viewed obliquely from above; and

FIG. 4 is a partly sectional elevational side-view of the outside rear-vision mirror in accordance with FIG. 1.

As will be seen from the drawing, and particularly FIG. 1 thereof, the central axis A—A1 which passes through the housing 1 and the mirror-holder 5, the latter being constructed as a rotatable body, forms with the coachwork of the vehicle represented by the horizontal line 2, an angle $\alpha$, and the rear end face of the housing 1 which defines the opening for mirror holder 5 is, in addition, formed to extend obliquely at an angle $\beta$, always more than 90°, so that it extends at right angles or approximately at right angles to the coachwork or to the horizontal line 2. The housing 1 is connected, by the main base 3, to the additional or auxiliary base part 4 (see FIG. 4), and a packing 15 with the coachwork 2, and its rear opening accommodates the mirror-holder 5, which can be adjusted in all directions. The end face of housing 1 is also formed to define, in addition to the angle, a further angle with reference to the center of the vehicle and obliquely in respect of the axis A–A1 of the housing. The purpose of providing the angle in connection with the adjustment of the mirror-holder 5, which is always aimed at the center of the vehicle, will become more evident hereafter. The mirror-holder 5 is capable of fine adjustment in all directions about its central pivotal point M with reference to the housing 1, and through a further angle $\delta$, so that it can be moved into the most favourable position from the point of view of the driver's vision, and can be fixed in this position by tightening the screw 6 which secures it to the housing 1. FIG. 4 shows that a line passing through the opening 19, which limits the adjustment of the spherical mirror-holder 5, to the pivot point is not perpendicular to the base-surface of the mirror-holder 5 but extends at an angle $\epsilon$ in respect of such base surface, and is thus also oblique in respect of the mirror-glass 11 carried by this mirror-holder. This eccentric position adopted for the screw hole 19 on the mirror-holder 5 also facilitates setting of the mirror so as to aim it at the center of the vehicle, provided the long side is towards the exterior of the vehicle and the short one nearer to the center of the vehicle. In this connection it should be noted that the outside rear-vision mirror in accordance with the embodiment shown in FIGS. 1 and 2 is intended for installation on the left-hand side of the vehicle. For the right hand side of the vehicle this arrangement should be constructed in reverse. The mirror-holder 5, eccentriccally perforated at an angle $\epsilon$, however, can be used for both sides of the vehicle simply by turning it through 180°.

To mount the outside rear-vision mirror on the coachwork of a vehicle, two screw-holes are bored into the coachwork, the packing 15 is placed on the coachwork, and the auxiliary base-part 16, from which the ends of the screws 17 embedded therein project upwards, is screwed fast onto the coachwork 2 by means of self-tapping sheet-metal screws 14. The main base 3, which overlies the additional base-part 16, and the suitably perforated or slotted housing 1, are then placed over the screws 17, and the nuts 18 are tightened by reaching into the open end of housing 1. The centering-disc 9 is then positioned in the mirror-holder 5, and the spherical head 8 of a hollow screw 7 which passes through the hole 19 in the mirror-holder 5, is passed through a central bore of the disc 9 and the screw 7 can thus be freely tilted in all directions. The spherical head 8 is biased against disc 9 by the pressure-spring 10, of which one end engages the head 8 while the other end presses the mirror-glass 11 against a spring-ring 12 which serves to hold the glass 11 in place. The adjustable mirror-holder 5 rests against the ring 13 having a U-shaped profile, and embracing the rear edge of the housing 1. Thus when the set-screw 6 is tightened by threading it into the hollow shank of the screw 7, the mirror-holder 5 is drawn into the opening of housing 1 and into engagement with the ring 13 being thus held securely in any desired position. To facilitate introduction of the screw 6 into the shank of screw 7, the shank of the screw 7 is given a sufficient surplus length to ensure that initially a wide ring-shaped gap exists between the hous- 1 and the mirror-holder 5 afford easy vision of the inside of the housing during the assembly operation.

I claim:
1. An outside rear-vision mirror, particularly intended for motor vehicles, comprising a base for screwing to the coachwork, a housing mounted on the base and having a rear opening, a mirror-holder having the approximate shape of a spherical cap held in said rear opening of said housing by a screw which passes through the housing in such a manner that the said mirror-holder can be moved to all sides, the central axis of said housing rising towards the rear and forming an acute angle $\alpha$ with the horizontal, the housing being cut at an obtuse angle $\beta$ in relation to the central axis of the housing, the plane of the rear opening of the housing being perpendicular to the horizontal.

2. A mirror, as claimed in claim 1, wherein the rear opening of the housing is additionally cut, in an approximately vertical plane, at an acute angle $\gamma$ with respect to a vertical plane perpendicular to the central axis.

3. A mirror, as claimed in claim 1, wherein the mirror-holder, in the shape of a spherical cap, has therein an opening the central axis of which is oblique with respect to the base-surface of the mirror-holder by an acute angle $\epsilon$, and which is situated eccentrically, said opening thereby limiting to a predetermined distance $\delta$ the distance to which the mirror-holder can be adjusted in all directions.

4. A mirror, as claimed in claim 1, including a centering-disc movably mounted inside the spherical-cap-shaped mirror-holder, a spherical head of a lengthened hollow screw, part of which is bored out, being pressed by a spring into the central opening of the said disc in such a way that the screw can undergo articulated movement, the other end of the spring pressing the mirror glass against mirror-supporting means.

5. A mirror, as claimed in claim 1, wherein the external contour of the outside rear-vision mirror, formed by the top of the housing and of the spherical-cap-shaped mirror-holder, as well as by the front edge of the base, defines a line having an approximately constant or slightly rising direction.

6. A mirror, as claimed in claim 1, wherein the housing rests on a hollowed-out base, the latter resting on a base-part connected by screws to the coachwork of the vehicle, these three parts being interconnected by screws projecting from the base.

References Cited
UNITED STATES PATENTS 2,457,348   12/1948   Chambers _____ 248—481 X
2,878,726   3/1959    Tuthill _____ 248—481
2,971,436   2/1961    Smith _____ 248—483

ROY D. FRAZIER, *Primary Examiner.*

F. DOMOTOR, *Assistant Examiner.*